(12) United States Patent
Nakamura et al.

(10) Patent No.: US 10,563,924 B2
(45) Date of Patent: Feb. 18, 2020

(54) HEAT EXCHANGER AND METHOD FOR MANUFACTURING PLATE-SHAPED FINS FOR HEAT EXCHANGER

(71) Applicant: Mitsubishi Electric Corporation, Tokyo (JP)

(72) Inventors: Shin Nakamura, Tokyo (JP); Akira Ishibashi, Tokyo (JP); Shinya Higashiiue, Tokyo (JP); Daisuke Ito, Tokyo (JP); Shigeyoshi Matsui, Tokyo (JP); Yuki Ugajin, Tokyo (JP); Takashi Okazaki, Tokyo (JP); Atsushi Mochizuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/026,528

(22) Filed: Jul. 3, 2018

(65) Prior Publication Data

US 2018/0320978 A1 Nov. 8, 2018

Related U.S. Application Data

(63) Continuation of application No. 15/504,467, filed as application No. PCT/JP2014/073609 on Sep. 8, 2014, now Pat. No. 10,041,739.

(51) Int. Cl.
  *F28D 1/04* (2006.01)
  *F28D 1/053* (2006.01)
  (Continued)

(52) U.S. Cl.
  CPC ............. *F28D 1/053* (2013.01); *B21D 53/08* (2013.01); *F25B 39/00* (2013.01); *F28F 1/32* (2013.01); *Y02B 30/22* (2013.01)

(58) Field of Classification Search
  CPC ..... F28F 1/32; F28F 9/02; F28F 1/325; F28D 1/053; B21D 3/08; B21D 53/08; F25B 39/00; Y02B 30/22
  (Continued)

(56) References Cited

U.S. PATENT DOCUMENTS 5,360,060 A 11/1994 Tanaka et al.
5,482,115 A 1/1996 Ikeya et al.
(Continued)

FOREIGN PATENT DOCUMENTS

CN 103697632 A 4/2014
DE 10 2012 002 234 A1 8/2013
(Continued)

OTHER PUBLICATIONS

Office Action dated Jan. 8, 2019 issued in corresponding JP patent application No. 2018-024876 (and English translation).
(Continued)

*Primary Examiner* — Davis D Hwu
(74) *Attorney, Agent, or Firm* — Posz Law Group, PLC

(57) ABSTRACT

Plate-shaped fins of a heat exchanger each include, at circumferential portions thereof defining a notch in which a heat transfer tube having a flattened shape is disposed, fin collars formed by being raised from the circumferential portions. Each of the fin collars includes, in a position that faces a long axis side surface of the heat transfer tube, at least one reflare section bent in a direction opposite to the side surface. At least one of the reflare sections defining fin pitches between the adjoining plate-shaped fins is formed so that a reflare tip portion, which is a tip portion of the reflare section, is drawn apart from a contact side surface of the plate-shaped fin with which the reflare section comes into contact.

4 Claims, 11 Drawing Sheets

(51) Int. Cl.
  *B21D 53/08* (2006.01)
  *F25B 39/00* (2006.01)
  *F28F 1/32* (2006.01)
(58) Field of Classification Search
  USPC ........................................................ 165/151
  See application file for complete search history.

(56) References Cited

U.S. PATENT DOCUMENTS

| | | | |
|---|---|---|---|
| 5,582,246 | A | 12/1996 | Dinh |
| 9,671,177 | B2 | 6/2017 | Ishibashi et al. |
| 2004/0177949 | A1 | 9/2004 | Shimoya et al. |
| 2004/0206484 | A1 | 10/2004 | Shimoya et al. |
| 2006/0070726 | A1 | 4/2006 | Yoshioka et al. |
| 2009/0044408 | A1 | 2/2009 | Lamkin |
| 2010/0051247 | A1* | 3/2010 | Sogabe ................. B21D 53/08 165/151 |
| 2013/0284416 | A1* | 10/2013 | Jindou .................... F28F 1/325 165/181 |
| 2013/0292104 | A1* | 11/2013 | Park .......................... F28F 9/02 165/173 |
| 2013/0340986 | A1 | 12/2013 | Lee et al. |
| 2014/0116667 | A1 | 5/2014 | Choi et al. |
| 2015/0075213 | A1 | 3/2015 | Ishibashi et al. |
| 2016/0076815 | A1* | 3/2016 | Chen ........................ F28F 1/32 165/181 |

FOREIGN PATENT DOCUMENTS

| | | |
|---|---|---|
| FR | 1539121 A | 9/1968 |
| JP | S53-15561 U | 2/1978 |
| JP | S55-34139 U | 3/1980 |
| JP | 56-080476 U1 | 6/1981 |
| JP | H03-184645 A | 8/1991 |
| JP | H08-29016 A | 2/1996 |
| JP | H09-324995 A | 12/1997 |
| JP | H10-078296 A | 3/1998 |
| JP | 2001-221587 A | 8/2001 |
| JP | 2003-329385 A | 11/2003 |
| JP | 2004-205124 A | 7/2004 |
| JP | 2005-121288 A | 5/2005 |
| JP | 2009-281693 A | 12/2009 |
| JP | 2010-54060 A | 3/2010 |
| JP | 2010-284688 A | 12/2010 |
| JP | 2011-064403 A | 3/2011 |
| JP | 2011-145023 A | 7/2011 |
| JP | 2012-163318 A | 8/2012 |
| JP | 2014-089018 A | 5/2014 |
| JP | 2014-094389 A | 5/2014 |
| WO | 2002/090856 A1 | 11/2002 |
| WO | 2013/160951 A1 | 10/2013 |

OTHER PUBLICATIONS

Office Action dated Jan. 22, 2019 issued in corresponding KR patent application No. 10-2018-7037603 (and English translation).
International Search Report of the International Searching Authority dated Nov. 25, 2014 for the corresponding international application No. PCT/JP2014/073609 (and English translation).
Office Action dated Jul. 11, 2017 issued in corresponding JP patent application No. 2016-547263 (and English translation).
Office action dated Apr. 13, 2018 issued in corresponding Korean patent application No. 10-2017-7004999 (and English translation).
Office action dated Apr. 11, 2018 issued in corresponding Australian patent application No. 2014405791.
Office action dated May 3, 2018 issued in corresponding CN patent application No. 201480081645.0 (and English translation).
Office Action dated Jul. 30, 2019 issued in corresponding KR patent application No. 10-2018-7037603 (and English translation).
Office Action dated Aug. 12, 2019 issued in corresponding AU patent application No. 2018278876.
Office Action dated Aug. 20, 2019 issued in corresponding JP patent application No. 2018-024876 (and English translation).
Office Action dated Sep. 24, 2019 issued in corresponding IN patent application No. 201747010350.
Office Action dated Nov. 12, 2019 issued in corresponding KR patent application No. 10-2019-7032001 (and English translation).

* cited by examiner (a)

(b)

(a)

(b)

● : HEAT-TRANSFER ENHANCEMENT SECTION (WITH LEADING EDGE EFFECT)

HEAT EXCHANGER AND METHOD FOR MANUFACTURING PLATE-SHAPED FINS FOR HEAT EXCHANGER

CROSS REFERENCE TO RELATED APPLICATIONS

The present application is a continuation application of U.S. utility application Ser. No. 15/504,467 filed on Feb. 16, 2017, which is a U.S. national stage application of PCT/JP2014/073609 filed on Sep. 8, 2014, the contents of which are incorporated herein by reference.

TECHNICAL FIELD

The present invention relates to a heat exchanger that is used, for example, in an air-conditioning apparatus or a refrigerating machine and a method for manufacturing plate-shaped fins for use in such a heat exchanger.

BACKGROUND ART

Conventionally, there has been known a fin and tube heat exchanger composed of a combination of a plurality of plate-shaped fins which are stacked at predetermined fin pitches and heat transfer tubes having a flattened shape with a substantially elliptical or substantially oval cross-section. Such a heat exchanger is configured, for example, to include: a plurality of plate-shaped fins which are stacked at predetermined fin pitches, each of the plate-shaped fins being provided with a plurality of notches at end portions thereof in a longitudinal direction; and a plurality of heat transfer tubes having a flattened shape, each of which is extended in a stacking direction of the plate-shaped fins, each of the heat transfer tubes being disposed in a corresponding one of the notches. Further, each of the heat transfer tubes has end portions connected to a distribution pipe or a header that is combined with these heat transfer tubes to form a refrigerant flow passage. Moreover, such a heat exchanger is designed to exchange heat between a heat exchange fluid such as air that flows through the plate-shaped fins and a heat exchanged fluid such as water or refrigerant that flows inside of the heat transfer tubes having a flattened shape.

A heat exchanger such as that described above is configured such that to improve close contact between the plate-shaped fins and the heat transfer tubes, each of the plurality of plate-shaped fins includes, at circumferential portions thereof defining the notches, fin collars which are raised perpendicularly from the circumferential portions and brought into contact with the heat transfer tubes either by furnace blazing or with an adhesive. Further, a heat exchanger such as that described above is known to be configured such that to improve heat exchanging performance of the plate-shaped fins, each of the plurality of plate-shaped fins includes, in regions thereof between the notches, lugs called slits bored in a mainstream direction of air or asperities called scratches in the mainstream direction of air. Further, a heat exchanger such as that described above is known which, to improve the heat exchanging performance, includes heat transfer tubes having a plurality of flow passages formed inside or heat transfer tubes having grooves formed in inner surfaces thereof.

Further, a conventional heat exchanger such as that described above which includes heat transfer tubes having a flattened shape is configured such that the pitches at which the plurality of plate-shaped fins are stacked are held constant and positioning is facilitated by cutting and raising parts of the plate-shaped fins to form spacers and bringing the spacers into contact with base surfaces of the adjoining fins in stacking the fins (see Patent Literature 1).

Further, a conventional heat exchanger such as that described above which includes heat transfer tubes having a flattened shape is configured such that the pitches at which the plurality of plate-shaped fins are stacked are held constant and positioning is facilitated by bending tip portions of those parts of the fin collars, which are raised perpendicularly from the circumferential portions of the plate-shaped fins defining the notches, outward to provide rectangular protruding sections called reflares and making these reflare sections have a height of bending that determines the fin pitches between the plate-shaped fins bringing the reflares into contact with base surfaces of the adjoining fins in stacking the fins (see Patent Literature 2).

CITATION LIST

Patent Literature

Patent Literature 1: Japanese Unexamined Patent Application Publication No. 2012-163318 (FIGS. 5 to 8)
Patent Literature 2: Japanese Unexamined Patent Application Publication No. 2011-64403 (FIG. 4)

SUMMARY OF INVENTION

Technical Problem

A conventional heat exchanger such as that described above, while allowing slits or scratches to be formed in the regions of the plate-shaped fins between the notches, does not allow slits or scratches to be formed in areas around the notches (i.e. areas around the heat transfer tubes), thus undesirably impairing the heat exchange performance at circumferential portions of the heat transfer tubes.

Further, the plate-shaped fins of the heat exchanger disclosed in Patent Literature 1 are configured such that the spacers are formed by making cuts in plate-shaped fin main bodies. However, making cuts in the plate-shaped fin main bodies undesirably causes a decrease in heat transfer area of the plate-shaped fins and causes the spacers to be located in an air passage to entail an increase in ventilation resistance.

Further, the plate-shaped fins of a heat exchanger such as those disclosed in Patent Literature 1 and Patent Literature 2 undesirably cause unused portions to be produced because of problems in reflare shape or fin shape. That is, the plate-shaped fins of a heat exchanger such as those disclosed in Patent Literature 1 and Patent Literature 2 undesirably cause much discarded material to be produced in pressing a plate-shaped member (e.g. an aluminum plate material) for use as the plate-shaped fins.

The present invention has been made to solve at least one of the aforementioned problems. the first object of the present invention is to provide a heat exchanger that can better improve the heat exchange performance at the circumferential portions of the heat transfer tubes than a conventional heat exchanger. Further, the second object of the present invention is to provide a manufacturing method that makes it possible to increase the capability of manufacturing plate-shaped fins for such a heat exchanger (i.e. the number of plate-shaped fins that are manufactured per unit time).

Solution to Problem

A heat exchanger according to an embodiment of the present invention includes: a plurality of plate-shaped fins which are stacked at predetermined fin pitches, each of the plate-shaped fins being provided with a plurality of notches arranged in a longitudinal direction of the plate-shaped fins; and a plurality of heat transfer tubes having a flattened shape, each of which is extended in a stacking direction of the plate-shaped fins, each of the heat transfer tubes being disposed in a corresponding one of the notches, wherein each of the plurality of plate-shaped fins includes, at circumferential portions thereof defining the notches, fin collars which come into contact with an outer circumference of the heat transfer tube, each of the fin collars includes at least one reflare section, the plate-shaped fins are arranged at the predetermined fin pitches so that the reflare section of one of the adjoining plate-shaped fins comes into contact with another one of the adjoining plate-shaped fins, and the at least one reflare section has a tip portion drawn apart from the adjoining plate-shaped fin.

Further, a method for manufacturing plate-shaped fins for a heat exchanger according to an embodiment of the present invention includes: a prepared hole forming step of forming a plurality of groups of prepared holes at predetermined intervals in a plate-shaped member, each of the groups of prepared holes including at least two first prepared holes; a cut line forming step of, after the prepared hole forming step, forming a cut in each of the groups of prepared holes to connect the first prepared holes; a raised portion forming step of, after the cut line forming step, subjecting the cult line to burring processing to form raised portions that are to become the fin collars and an opening that is to become the notches; a reflare section forming step of, after the raised portion forming step, subjecting the raised portions to reflare processing to form the reflare sections; and a cutting step of, after the reflare section forming step, cutting the plate-shaped member along an array direction of the groups of prepared holes to form the fin collars and the notches.

Advantageous Effects of Invention

The heat exchanger according to the embodiment of the present invention allows the pitches at which the plate-shaped fins are stacked to be held constant by the reflare sections without inviting an increase in ventilation resistance or a decrease in heat transfer area of the plate-shaped fins due to spacers or the like. Furthermore, the heat exchanger according to the embodiment of the present invention can bring about a leading edge effect at the tip portion drawn apart from the plate-shaped fin with which the reflare section comes into contact, thus making it possible to improve in heat exchange performance at circumferential portions of the heat transfer tube.

Further, the method for manufacturing plate-shaped fins for a heat exchanger according to the embodiment of the present invention makes it possible to prevent discarded material from being produced from the plate-shaped member, which serves as a row material for the plate-shaped fins, except for the first prepared holes that are formed in the prepared hole forming step. For this reason, the method for manufacturing plate-shaped fins for a heat exchanger according to the embodiment of the present invention makes it possible to efficiently use the plate-shaped member, which serves as a row material for the plate-shaped fins, and thus reduce the cost of the heat exchanger.

Further, the method for manufacturing plate-shaped fins for a heat exchanger according to the embodiment of the present invention allows the fin collars and notches of two plate-shaped fins to be formed at a time by cutting the plate-shaped member along the array direction of the groups of prepared holes in the cutting step. That is, the method for manufacturing plate-shaped fins for a heat exchanger according to the embodiment of the present invention makes it possible to manufacture two plate-shaped fins at a time. For this reason, the method for manufacturing plate-shaped fins for a heat exchanger according to the embodiment of the present invention makes it possible to increase the capability of manufacturing plate-shaped fins.

DESCRIPTION OF EMBODIMENTS

Embodiment 1

In the following, a heat exchanger 4 according to Embodiment 1 of the present invention and plate-shaped fins 3 for use in the heat exchanger 4 are described with reference to FIGS. 1 to 14.

It should be noted that to facilitate easy comprehension of a configuration of the plate-shaped fins 3 according to Embodiment 1, the heat exchanger 4 and the plate-shaped fins 3 according to Embodiment 1 of the present invention are described with reference to enlarged views of the main components (which illustrate a part of the heat exchanger 4 with a focus on two of the plate-shaped fins 3 and one of the heat transfer tubes 1).

Figure 1:
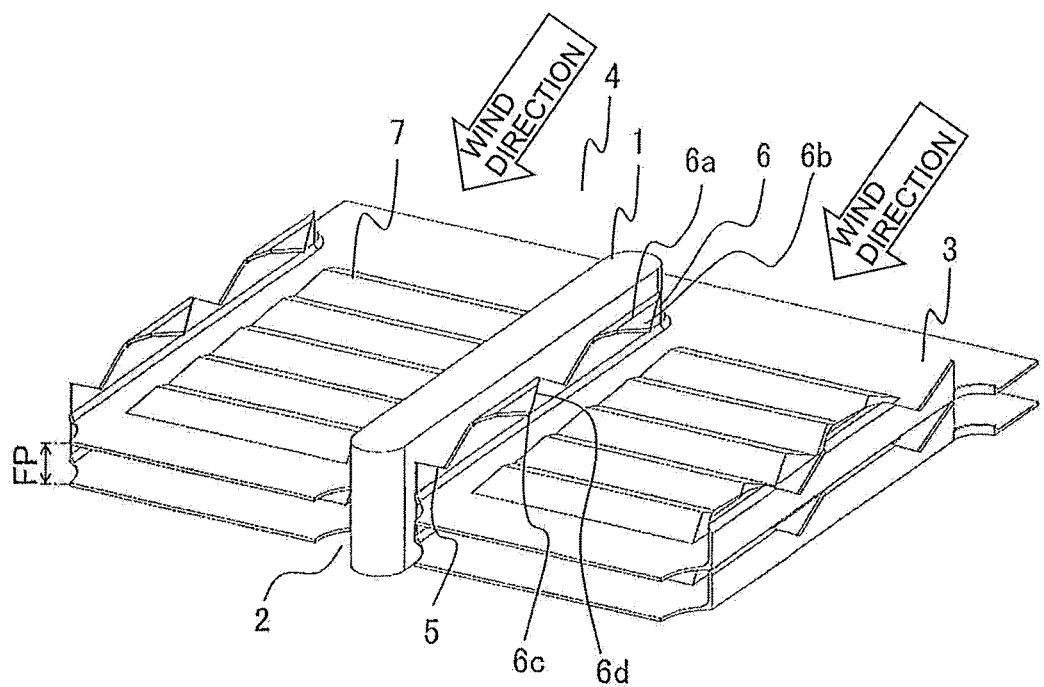
FIG. 1 is a perspective view showing a heat exchanger according to Embodiment 1 of the present invention.
Figure 2:
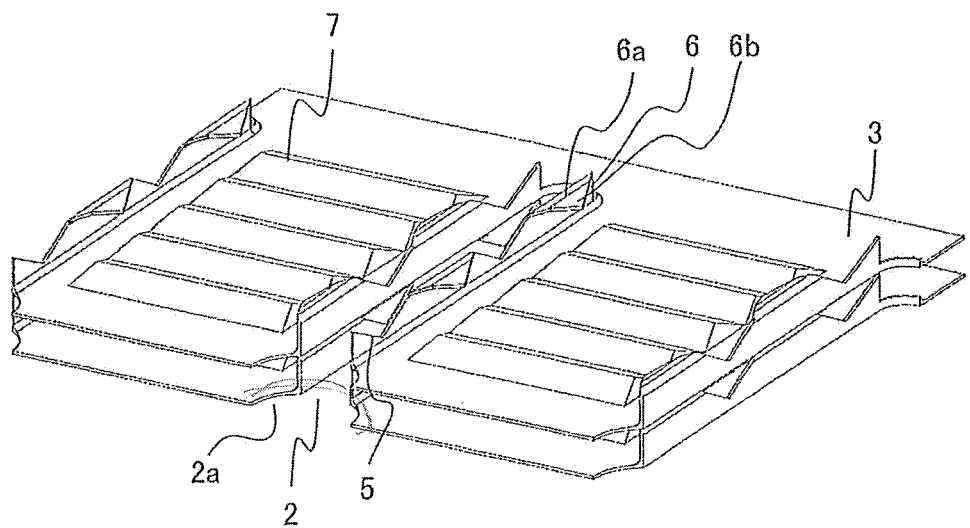
FIG. 2 is a perspective view (enlarged view of the main components) showing a stacked state of plate-shaped fins in the heat exchanger according to Embodiment 1 of the present invention.
Figure 3:
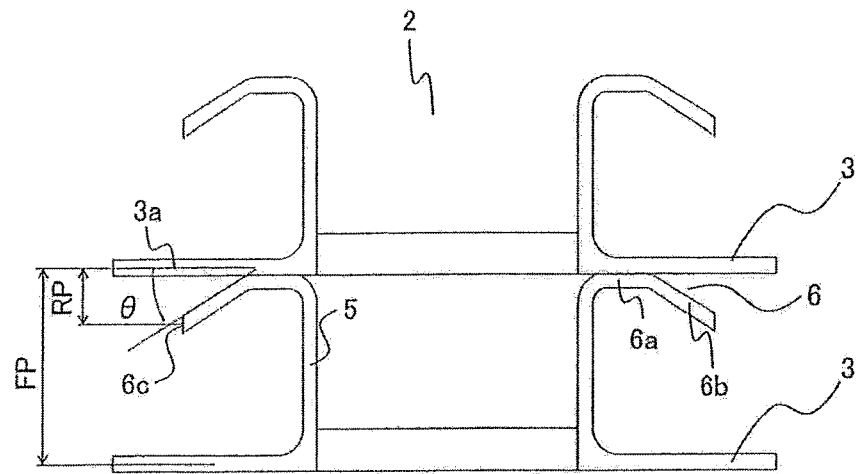
FIG. 3 is a side view of the plate-shaped fins shown in FIG. 2.

FIG. 1 is a perspective view (enlarged view of the main components) showing a heat exchanger according to Embodiment 1 of the present invention. FIG. 2 is a perspective view (enlarged view of the main components) showing a stacked state of plate-shaped fins in the heat exchanger according to Embodiment 1 of the present invention. Further, FIG. 3 is a side view of the plate-shaped fins shown in FIG. 2. It should be noted that FIG. 3 offers an observation of the plate-shaped fins 3 in a longitudinal direction of notches 2 (i.e. a long axis direction of a heat transfer tube 1).

The heat exchanger 4 according to Embodiment 1 is a fin and tube heat exchanger, and includes: a plurality of plate-shaped fins 3 which are stacked at predetermined fin pitches FP, each of the plate-shaped fins 3 being provided with a plurality of notches 2 at end portions thereof in a longitudinal direction; and a plurality of heat transfer tubes 1 having a flattened shape, each of which is extended in a stacking direction of the plate-shaped fins 3, each of the heat transfer tubes 1 being disposed in a corresponding one of the notches 2. In Embodiment 1, the plate-shaped fins 3 and the heat transfer tubes 1 are made, for example, of aluminum (aluminum or an aluminum alloy).

Figure 4:
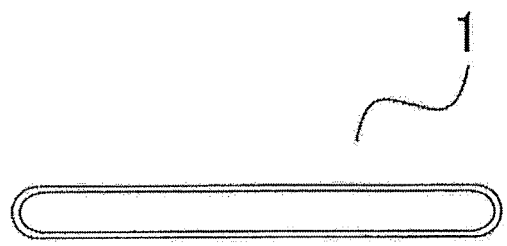
FIG. 4 is a cross-sectional view showing an example of a heat transfer tube according to Embodiment 1 of the present invention.
Figure 5:
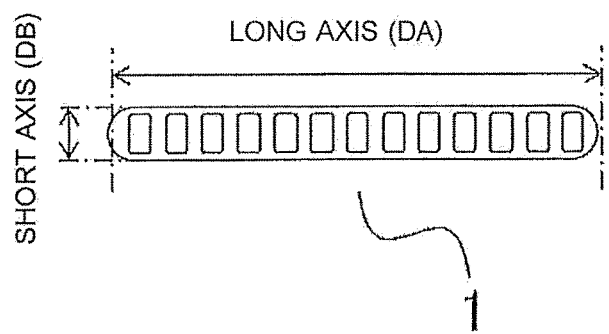
FIG. 5 is a cross-sectional view showing another example of a heat transfer tube according to Embodiment 1 of the present invention.

Each of the heat transfer tubes 1 needs only include at least one or more refrigerant flow passages inside, and is configured as shown, for example, in FIG. 4 or 5.

FIG. 4 is a cross-sectional view showing an example of a heat transfer tube according to Embodiment 1 of the present invention.

For example, the heat transfer tube 1 is formed into a flattened shape with a substantially oval cross-section and has one refrigerant flow passage formed inside thereof.

FIG. 5 is a cross-sectional view showing another example of a heat transfer tube according to Embodiment 1 of the present invention.

For example, the heat transfer tube 1 may be formed into a flattened shape with a substantially oval cross-section and have a plurality of refrigerant flow passages formed inside thereof to extend in the long axis direction of the heat transfer tube 1. The formation of the plurality of refrigerant flow passages inside allows an increase in area of contact between inner surfaces of the heat transfer tube and the refrigerant and thus improves heat exchange efficiency.

Further, the heat transfer tube 1 is not limited in configuration to FIG. 4 or 5. For example, the cross-sectional shape of the heat transfer tube 1 may be formed into a substantially elliptical shape. Further, for example, the heat transfer tube 1 may have grooves cut into wall surfaces of the refrigerant flow passage(s) (i.e. inner wall surfaces of the heat transfer tube 1). This allows an increase in area of contact between the inner surfaces of the heat transfer tube and the refrigerant and thus improves heat exchange efficiency.

It should be noted that, as shown in FIG. 5, the long axis diameter and short axis diameter of the heat transfer tube 1 are defined as DA and DB, respectively.

The plate-shaped fins 3 according to Embodiment 1 are described here in more detail.

As mentioned above, each of the plate-shaped fins 3 is provided with a plurality of notches 2 at end portions thereof in a longitudinal direction, each of the heat transfer tubes 1 being disposed in a corresponding one of the notches 2. For this reason, as shown in FIGS. 1 and 2, the shape of each of the notches 2 is formed into a shape that corresponds to the cross-sectional shape of the heat transfer tube 1. Further, in Embodiment 1, to facilitate each of the heat transfer tubes 1 to be disposed in a corresponding one of the notches 2, each of the notches 2 includes, at an opening side end portion thereof, a guiding portion 2a that is larger in width than the notch 2.

Furthermore, each of the plurality of plate-shaped fins 3 includes, at circumferential portions thereof defining the notches 2, fin collars 5 which are formed by being raised from the circumferential portions and come into contact with an outer circumference of the heat transfer tube 1. Moreover, each of the fin collars 5 includes, in a position that faces a long axis side surface of the heat transfer tube 1 that comes into contact with the fin collar 5, at least one reflare section 6 bent in a direction opposite to the side surface. As shown in FIG. 3, the adjoining plate-shaped fins 3 are arranged at the fin pitches FP so that the reflare section 6 (more specifically a reflare base portion 6a) of one of the adjoining plate-shaped fins 3 comes into contact with a bottom surface portion 3a (contact side surface) of another one of the adjoining plate-shaped fins 3. It should be noted that, in Embodiment 1, considering the stability in keeping the fin pitches FP between the adjoining plate-shaped fins 3, the reflare sections 6 are provided in positions that face both long axis side surfaces of the heat transfer tube 1.

The aforementioned reflare sections re described in more detail. Each of the reflare sections 6 has a reflare base portion 6a and a reflare tip portion 6b. As mentioned above, the reflare base portion 6a is a part that comes into contact with the bottom surface portion 3a of the adjoining plate-shaped fin 3 to keep the fin pitches FP. Further, the reflare tip portion 6b is formed to be drawn apart from the bottom surface portion 3a of the plate-shaped fin 3 with which the reflare base portion 6a comes into contact.

It should be noted that a part of the reflare tip portion 6b that is farthest in the stacking direction of the plate-shaped fins 3 from the bottom surface portion 3a of the plate-shaped fin 3 with which the reflare base portion 6a comes into contact is particularly defined as a terminal portion 6c of the reflare tip portion.

That is, as shown in FIG. 3, assuming that an angle formed by the bottom surface portion 3a of the plate-shaped fin 3 with which the reflare base portion 6a comes into contact and the reflare tip portion 6b is θ, θ>0 is satisfied. Since θ>0, the reflare tip portion 6b is drawn apart from the bottom surface portion 3a of the plate-shaped fin 3 with which the reflare base portion 6a comes into contact. That is, it is possible to ensure a heat transfer surface in the air passage through which air flows (i.e. between the bottom surface portions 3a of the adjoining plate-shaped fins 3). In particular, a reflare windward portion 6d (also see FIGS. 6 to 9 described below), which serves as a windward side end portion of the reflare tip portion 6b, is a region where a thermal boundary layer is yet to be developed, achieves locally good heat transfer by bringing about a leading edge effect, and thus improves heat exchange performance of the plate-shaped fins 3.

That is, such a configuration of the reflare sections 6 in Embodiment 1 makes it possible to ensure an area of heat transfer in regions at the circumferential portions of the heat transfer tube 1 where it is difficult to enhance heat transfer, and furthermore, the leading edge effect ensures efficient heat exchange.

In particular, it is preferable that the angle formed by the bottom surface portion 3a of the plate-shaped fin 3 with which the reflare base portion 6a comes into contact and the reflare tip portion 6b satisfies 0 degrees<θ<90 degrees. When 0 degrees<θ<90 degrees, air passes through the reflare tip portion 6b at a higher speed. This makes it possible to bring about a leading edge effect more efficiently. Further, in a case where θ>90 degrees, the distance between the fin collar 5 and the reflare tip portion 6b becomes shorter. This facilitates bridging of water formed by condensation from moisture produced in air in using the heat exchanger 4 as an evaporator.

Further, each of the plate-shaped fins 3 according to Embodiment 1 has scratches 7 formed on a fin surface thereof. The formation of the scratches 7 enhances the transfer of heat through those parts than when the plate-shaped fin 3 has a planar shape, and also makes it possible to bring about improvement in buckling strength of the plate-shaped fin 3. It should be noted that each of the plate-shaped fins 3 may have lugs called slits formed either together with the scratches 7 or instead of the scratches 7. The formation of the slits in the plate-shaped fins 3, too, enhances heat transfer.

It should be noted that the reflare sections 6 according to Embodiment 1 are not limited in shape to the configuration described above. The following shows examples of shapes of reflare sections 6.

FIGS. 6 to 9 are plan views showing example of plate-shaped fins according to Embodiment 1 of the present invention.

Figure 6:
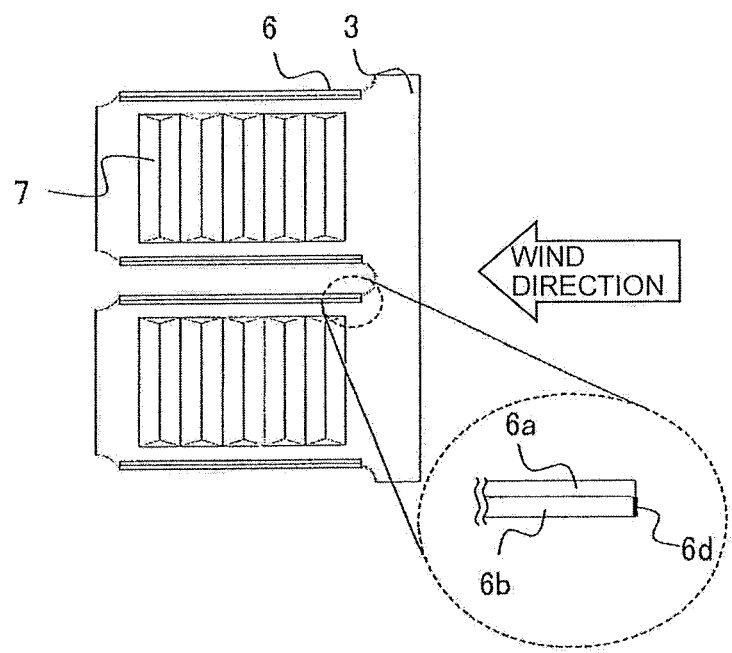
FIG. 6 is a plan view showing an example of a plate-shaped fin according to Embodiment 1 of the present invention.
Figure 7:
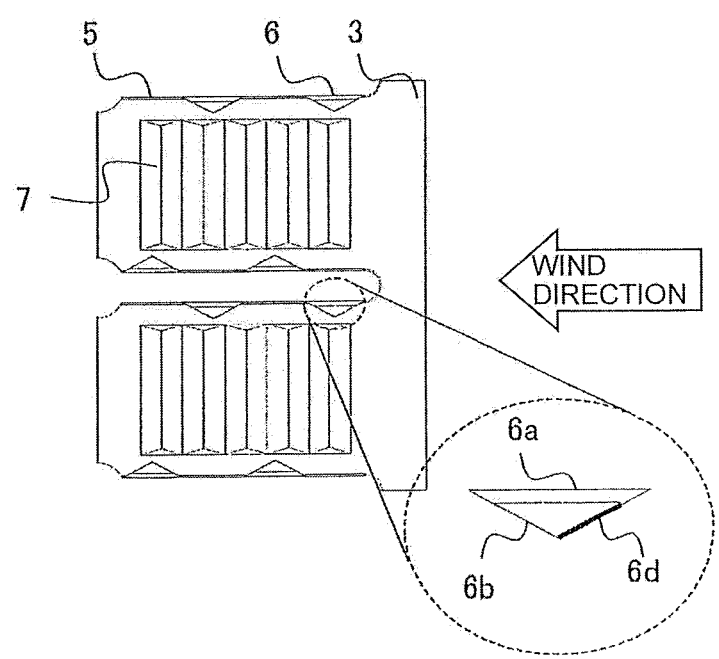
FIG. 7 is a plan view showing an example of a plate-shaped fin according to Embodiment 1 of the present invention.
Figure 8:
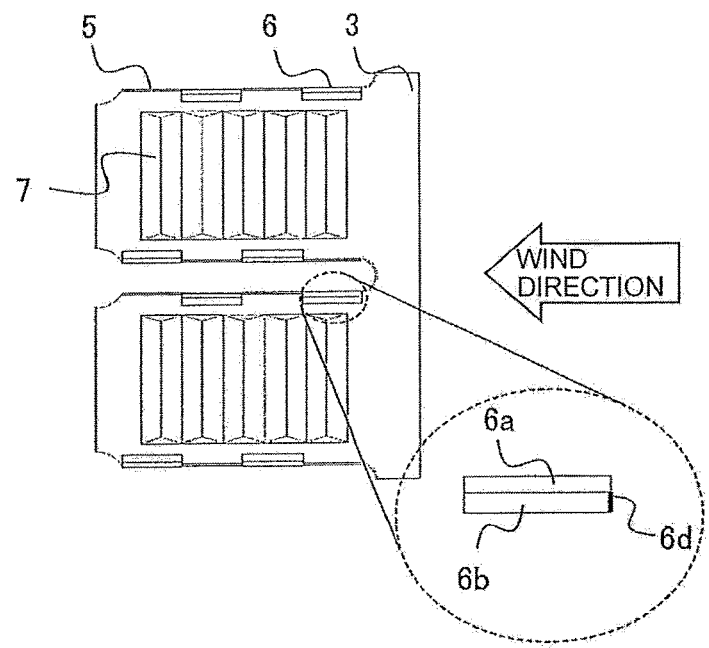
FIG. 8 is a plan view showing an example of a plate-shaped fin according to Embodiment 1 of the present invention.
Figure 9:
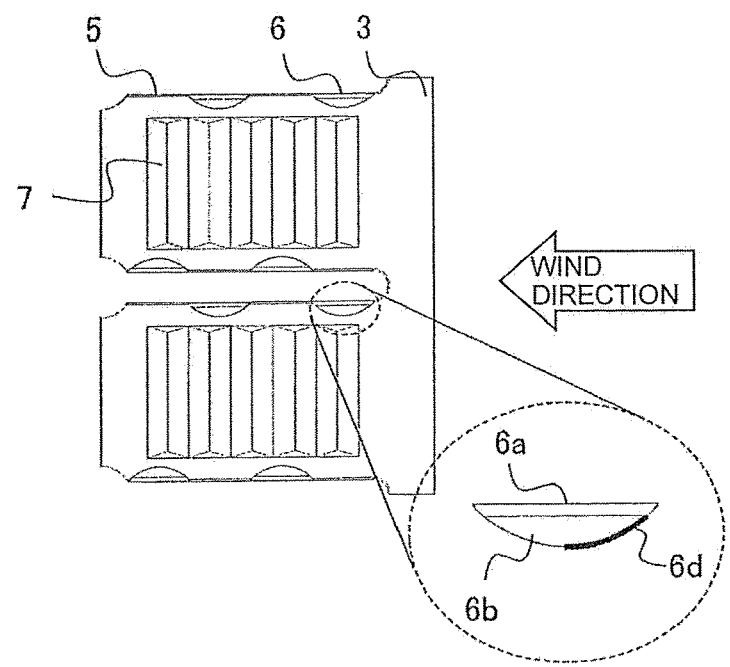
FIG. 9 is a plan view showing an example of a plate-shaped fin according to Embodiment 1 of the present invention.

For example, as shown in FIGS. 6 and 8, each of the reflare sections 6 may be formed into a rectangular shape. For example, as shown in FIG. 7, each of the reflare sections 6 may be formed into a triangular shape. Further, for example, as shown in FIG. 9, each of the reflare sections 6 may be formed into a sinusoidal shape. Further, for example, each of the reflare sections 6 may of course be formed into any shape other than those shown in FIGS. 6 to 9. Further, although, in FIGS. 6 to 9, the reflare sections 6 are provided in positions that face both long axis side surfaces of the heat transfer tube 1, each of the reflare sections 6 may alternatively be provided in a position that faces either of the side surfaces. Further, although, in the foregoing description, all of the reflare sections 6 are provided with tip portions 6b, providing at least one of the reflare sections 6 with a reflare tip portion 6b makes it possible to ensure an area of heat transfer in the regions at the circumferential portions of the heat transfer tube 1, and the leading edge effect ensures efficient heat exchange.

Figure 10:
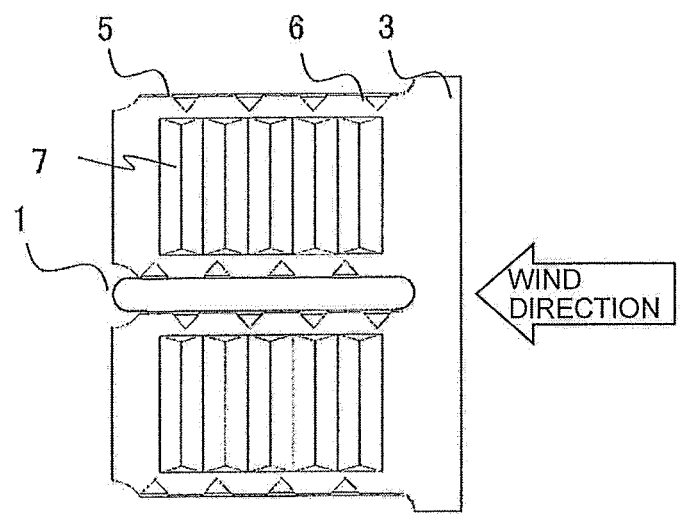
FIG. 10 is a plan view showing another example of a plate-shaped fin according to Embodiment 1 of the present invention.

Further, FIG. 10 is a plan view showing another example of a plate-shaped fin according to Embodiment 1 of the present invention.

In FIGS. 1 to 9 described above, with a focus on each of the fin collars 5 provided at the circumferential portions of the same notch 2, at most two reflare sections 6 (tip portions 6b) are provided along the long axis direction of the heat transfer tube 1 in a position that faces one long axis side surface of the heat transfer tube 1. This number is not intended to define the maximum number of reflare sections 6 that are provided in a position that faces one long axis side surface of the heat transfer tube 1. For example, as shown in FIG. 10, three or more (four in FIG. 10) reflare sections 6 (tip portions 6b) may be provided along the long axis direction of the heat transfer tube 1 in a position that faces one long axis side surface of the heat transfer tube 1. Thus, increasing the number of reflare sections 6 (tip portions 6b) makes it possible to ensure a larger number of reflare windward portions 6d that can bring about a leading edge effect, thus making it possible to bring about improvement particularly in heat exchange performance.

Figure 11:
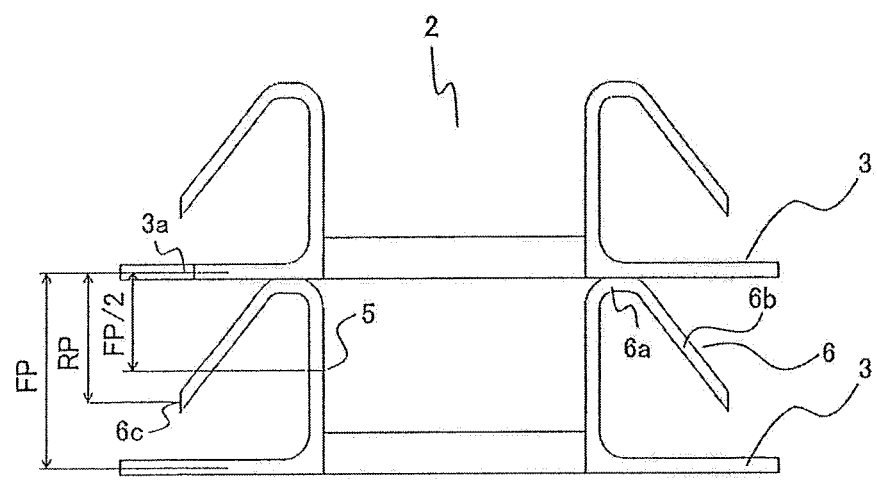
FIG. 11 is a side view showing still another example of plate-shaped fins according to Embodiment 1 of the present invention.

FIG. 11 is a side view showing still another example of plate-shaped fins according to Embodiment 1 of the present invention.

Assuming that the distance between the bottom surface portion 3a of the plate-shaped fin 3 and the terminal portion 6c of the reflare portion (i.e. the distance between the plate-shaped fins 3 in the stacking direction) is a reflare pitch RP, the plate-shaped fins 3 shown in FIG. 3 are such that the reflare pitch RP is shorter than half the length of each of the fin pitches FP. Without being limited to this, the plate-shaped fins 3 may be formed so that the reflare pitch RP is longer than half the length of the fin pitch FP as shown in FIG. 11. The speed of air that passes through the flow passage between the plate-shaped fins 3 reaches its maximum in the middle of the fin pitch FP apart from the bottom surface portions 3a of the plate-shaped fins 3. For this reason, forming the plate-shaped fins 3 so that the reflare pitch RP is longer than half the length of the fin pitch FP ensures a larger number of reflare windward portions 6d that can bring about a leading edge effect, thus making it possible to bring about improvement particularly in heat exchange performance.

As mentioned above, the heat transfer tubes 1 according to Embodiment 1 may be heat transfer tubes each having a plurality of refrigerant flow passages formed inside. By including such heat transfer tubes 1 each having a plurality of refrigerant flow passages and the above-described plate-shaped fins 3, the heat exchanger 4 can bring about the following effects.

Note here that to facilitate easy comprehension of the effects of the heat exchanger 4 according to Embodiment 1, the following first describes a heat exchanger 104 that has no reflare sections 6 (i.e. tip portions 6b). After that, the heat exchanger 4 according to Embodiment 1 is described. It should be noted that components that the heat exchanger 104, which has no reflare sections 6 (i.e. tip portions 6b), and the heat exchanger 4 according to Embodiment 1 share in common are given the same reference signs.

Figure 12:
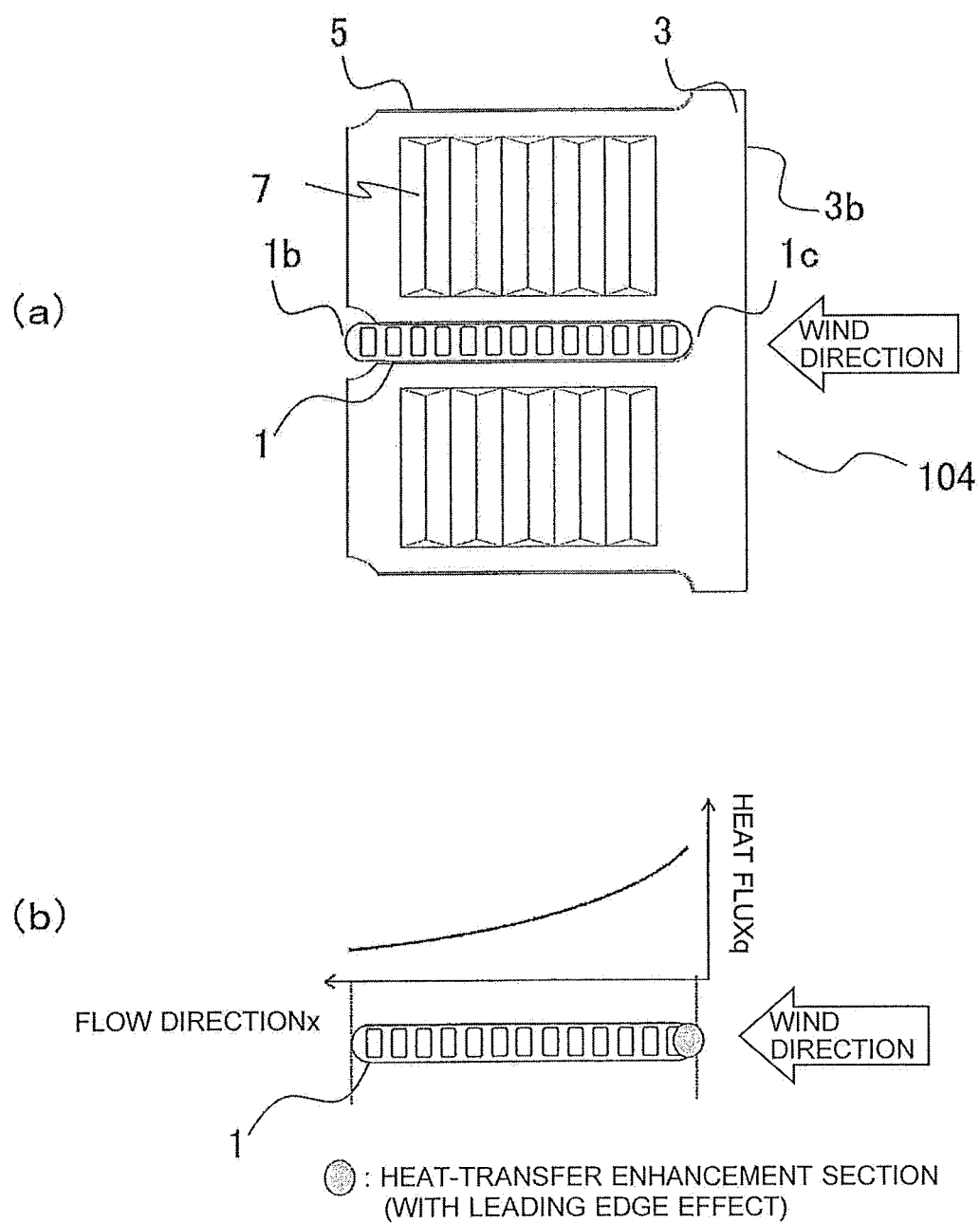
FIG. 12 illustrates diagrams showing a heat exchanger serving as a comparative example.

FIG. 12 illustrates diagrams showing a heat exchanger serving as a comparative example. Note here that FIG. 12(a) is a plan view showing the heat exchanger 104, which serves as a comparative example. Further, FIG. 12(b) is a diagram showing a heat flux distribution of the heat exchanger 104. It should be noted that air flows into the heat exchanger 104 from the direction indicated by the open arrow.

As shown in FIG. 12(a), the heat exchanger 104, which serves as a comparative example, includes a heat transfer tube 1 having a plurality of flow passages through which refrigerant (or water) flows. However, the heat exchanger 104 is configured to have no reflare sections 6 (i.e. tip portions 6b). In the heat exchanger 104 thus configured, air flows into the heat exchanger 104 from the right side of the plane of sheet, exchanges heat with the refrigerant in the heat transfer tube 1 and with the plate-shaped fins 3, and flows out from the left side of the plane of sheet. This can bring about a leading edge effect at a windward side end portion 1c of the heat transfer tube 1, thus enhancing the transfer of heat through the refrigerant flow passages in the heat transfer tube 1 that are close to the end portion. At this point, the heat exchanger 104 cannot bring about a leading edge effect at a leeward side end portion 1b of the heat transfer tube 1, therefore there is a difference in heat transfer performance between the windward side end portion 1c and the leeward side end portion 1b of the heat transfer tube 1. Further, the temperature difference between the refrigerant flowing through the refrigerant flow passages on the windward side of the heat transfer tube 1 and the air becomes larger than the temperature difference between the refrigerant flowing through the refrigerant flow passages on the leeward side of the heat transfer tube 1 and the air. This causes the heat exchanger 104 to create imbalances in heat flux across the refrigerant flow passages in the heat transfer tube 1 and create variations in the temperature distribution of the refrigerant among the refrigerant flow passages, resulting in a decrease in heat exchange performance per heat transfer tube 1.

Further, assume that the heat exchanger 104 is used as an outdoor heat exchanger (evaporator) for example under an environment where the heat exchanger 104 is frosted at an outdoor temperature of about 2 degrees Celsius or lower and a refrigerant evaporation temperature of 0 degrees Celsius or lower. In this case, since a windward side end portion 3b of each of the plate-shaped fins 3 and the windward end portion 1c of the heat transfer tube 1 bring about a leading edge effect to improve in heat exchange performance and are arranged in a position where the air has the largest amount of absolute humidity, heat exchange is concentrated at the windward side end portion 3b of the plate-shaped fin 3 and the windward end portion 1c of the heat transfer tube 1, whereby it becomes easier for these places to be frosted. As a result, the heat exchanger 104 has its air passage clogged by frost near these places. The clogging causes an increase in ventilation resistance. The increase in ventilation resistance leads to a decrease in air volume. The decrease in air volume leads to a decrease in heat exchange performance.

Meanwhile, this problem can be solved by the heat exchanger 4 including heat transfer tubes 1 each having a plurality of refrigerant flow passages and the above-described plate-shaped fins 3.

Figure 13:
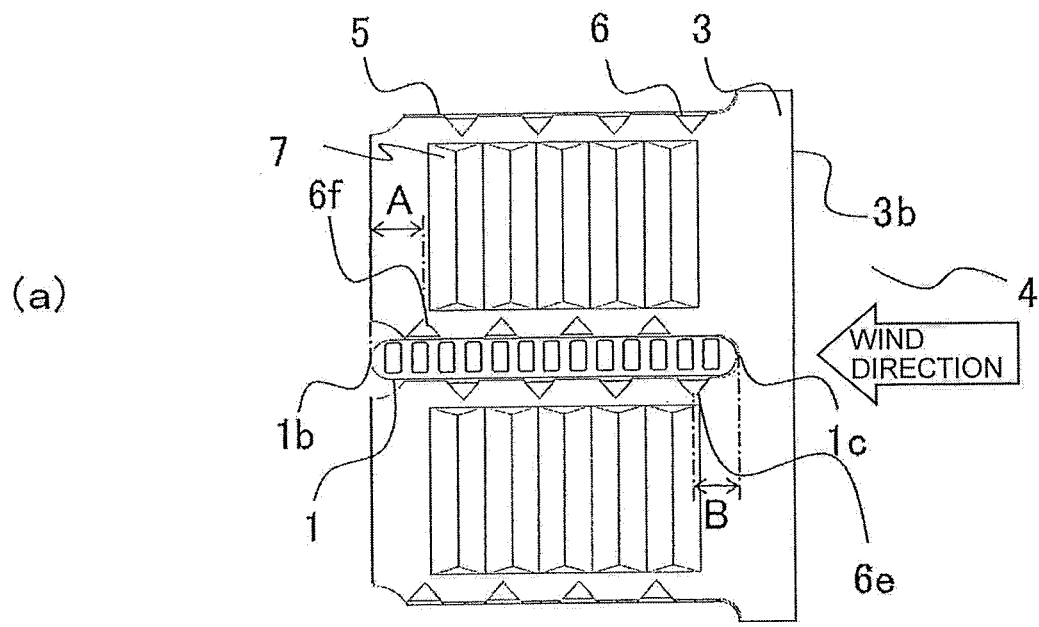
FIG. 13 illustrates diagrams showing an example of a heat exchanger according to Embodiment 1 of the present invention which includes a heat transfer tube having a plurality of refrigerant flow passages.
Figure 13:
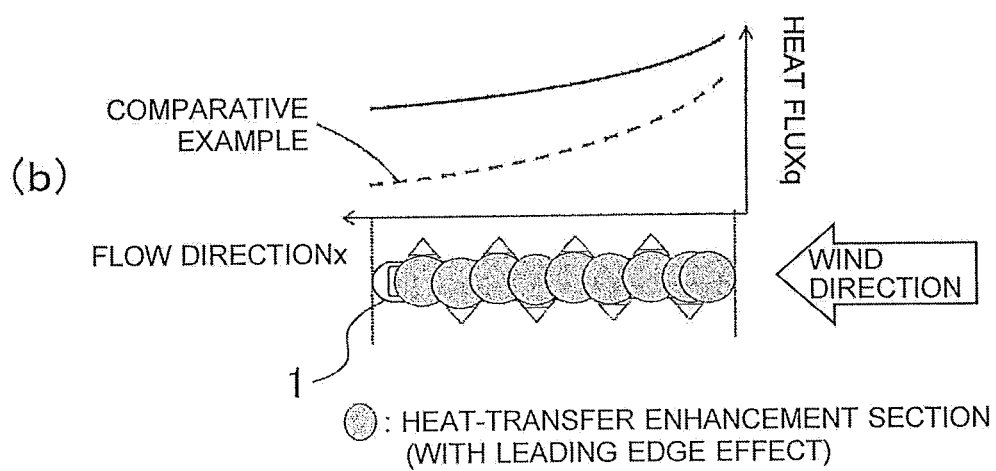
Figure 14:
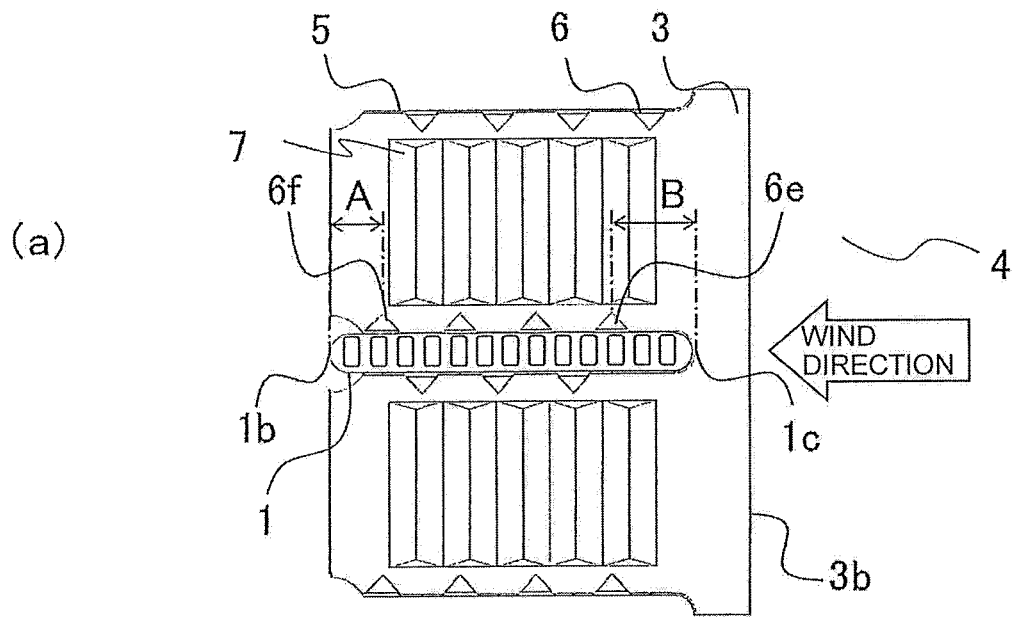
FIG. 14 illustrates diagrams showing an example of a heat exchanger according to Embodiment 1 of the present invention which includes a heat transfer tube having a plurality of refrigerant flow passages.
Figure 14:
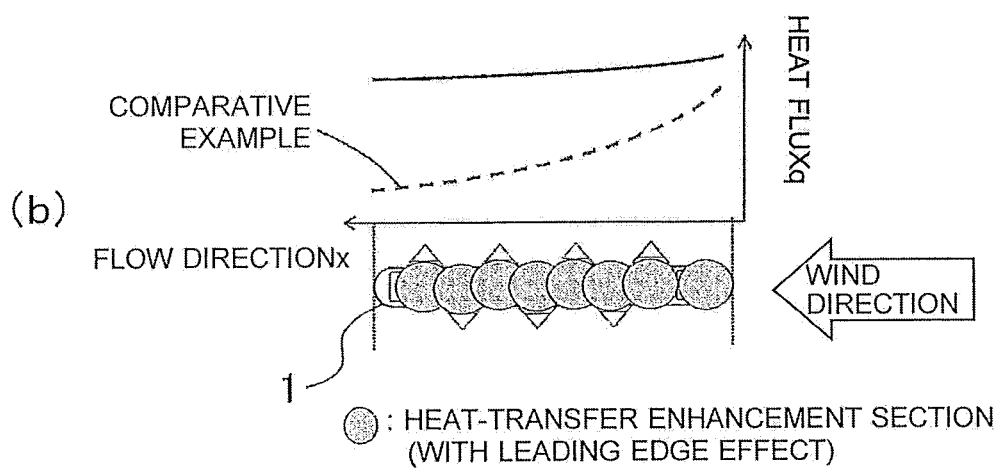

Each of FIGS. 13 and 14 illustrates diagrams showing an example of a heat exchanger according to Embodiment 1 of the present invention which includes a heat transfer tube having a plurality of refrigerant flow passages. Note here that each of FIGS. 13(a) and 14(a) is a plan view showing a heat exchanger 4 according to Embodiment 1. Further, each of FIGS. 13(b) and 14(b) is a diagram showing a heat flux distribution of the heat exchanger 4 shown in the corresponding drawing. In each of FIGS. 13 and 14, air flows into the heat exchanger 4 from the direction indicated by the open arrow. Note here that reference sign 6e refers to that one of the tip portions 6b which is closest to the windward side end portion 1c (first end portion) of the heat transfer tube 1 and reference sign 6f refers to that one of the tip portions 6b which is closest to the leeward side end portion 1b (second end portion) of the heat transfer tube 1.

It should be noted that the heat exchanger 4 shown in FIG. 13 and the heat exchanger 4 shown in FIG. 14 differ from each other in terms of the "distance B between the windward side end portion 1c (first end portion) of the heat transfer tube 1 and the reflare tip portion 6e which is closest to the windward side end portion 1c".

As shown in FIGS. 13 and 14, the heat exchangers 4 according to Embodiment 1 each include a heat transfer tube 1 having a plurality of flow passages through which refrigerant (or water) flows. Further, each of these heat exchangers 4 includes a plurality of the plate-shaped fins 3 shown in FIG. 10 (each of which has four reflare sections 6 (tip portions 6b) provided in positions that face both long axis side surfaces of the heat transfer tube 1). As mentioned above, increasing the number of tip portions 6b ensures a larger number of reflare windward portions 6d that can bring about a leading edge effect. This reduces the occurrence of differences in heat flux among the refrigeration flow passages in the heat transfer tube 1. Therefore, the heat exchanger 4 according to Embodiment 1 can reduce the variations in the temperature distribution of the refrigerant among the refrigerant flow passages, thus making it possible to bring about improvement in heat exchange performance per heat transfer tube 1 (i.e. heat exchange performance at the circumferential portions of the heat transfer tube 1). It should be noted that since each of the plate-shaped fins 3 shown in FIGS. 13 and 14 has a plurality of tip portions 6b provided in positions that face both long axis side surfaces of the heat transfer tube 1, the number of tip portions 6b can be made larger than in a case where a plurality of tip portions 6b are provided only in a position that faces one long axis side surface of the heat transfer tube 1, whereby more of the effect can be brought about.

Note here that the heat exchanger 4 shown in FIG. 14 is configured such that the "distance B between the windward side end portion 1c (first end portion) of the heat transfer tube 1 and the reflare tip portion 6e which is closest to the windward side end portion 1c" is longer than the "distance A between the leeward side end portion 1b (second end portion) of the heat transfer tube 1 and the reflare tip portion 6f which is closest to the leeward side end portion 1b". That is, the heat exchanger 4 shown in FIG. 14 is configured such that the reflare tip portion 6e which is closest to the windward side end portion 1c is drawn apart from the windward side end portion 1c. This makes it possible to reduce overlap between a position in the windward side end portion 1c of the heat transfer tube 1 where a leading edge effect is brought about and a position in the reflare tip portion 6e where a leading edge is brought about. This makes it possible to correct the imbalances in heat flux across the refrigerant flow passages in the heat transfer tube 1. Therefore, the heat exchanger 4 shown in FIG. 14 can further reduce the variations in the temperature distribution of the refrigerant among the refrigerant flow passages, thus making it possible to bring about improvement in heat exchange performance per heat transfer tube 1 (i.e. heat exchange performance at the circumferential portions of the heat transfer tube 1).

Further, since each of the heat exchangers 4 shown in FIGS. 13 and 14 improves heat exchange performance at the circumferential portions of the heat transfer tube 1 while reducing the imbalances in heat flux at the circumferential portions of the heat transfer tube 1, the heat exchanger 4 is small in difference between the heat exchange performance of the windward side end portion 3b of the plate-shaped fin 3 and the heat exchange performance at the circumferential portions of the heat transfer tube 1. Therefore, each of the heat exchangers 4 shown in FIGS. 13 and 14 can disperse a distribution of frost formation under an environment where frost formation takes place. This, therefore, provides a heat exchanger whose air passage is hardly clogged and whose resistance to frost formation is improved.

Embodiment 2

Embodiment 2 describes a method for manufacturing a heat exchanger 4 described in Embodiment 1, particularly a method for manufacturing plate-shaped fins 3. Manufacturing plate-shaped fins 3 according to Embodiment 2 reduces the cost of the heat exchanger 4 and increases the capability of manufacturing plate-shaped fins 3 (i.e. the number of plate-shaped fins 3 that are manufactured per unit time).

It should be noted that those components of Embodiment 2 to which no particular reference is made are identical to those of Embodiment 1 and those components of Embodiment 2 which are the same as those of Embodiment 1 are given the same reference signs. Further, Embodiment 2 uses an aluminum plate member 11 (aluminum plate material or an aluminum alloy plate material) as an example of a row material for plate-shaped fins 3.

Figure 15:
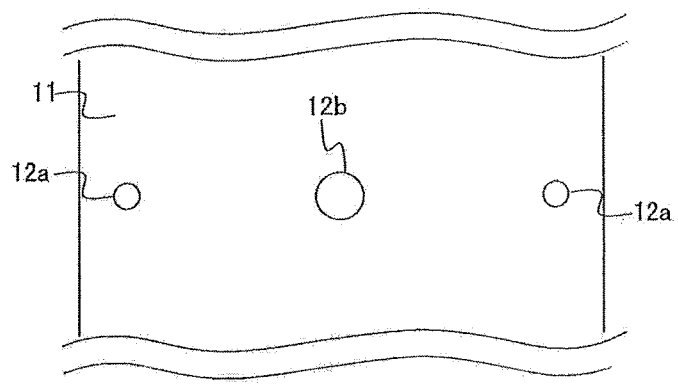
FIG. 15 is an explanatory diagram for explaining a method for manufacturing plate-shaped fins according to Embodiment 2 of the present invention and also a plan view for explaining a prepared hole forming step.

FIG. 15 is an explanatory diagram for explaining a method for manufacturing plate-shaped fins according to Embodiment 2 of the present invention and also a plan view for explaining a prepared hole forming step.

In manufacturing plate-shaped fins 3, first, a plurality of groups of prepared holes are formed at predetermined intervals in the aluminum plate member 11, which serves as a row material for the plate-shaped fins 3. Each of the groups of prepared holes includes at least two first prepared holes 12a. Each of the first prepared holes 12a forms a bottom portion of a corresponding one of the notches 2. It should be noted that, in Embodiment 2, a guiding portion 2a is formed at an open end of each of the notches 2 of each of the plate-shaped fins 3. For this reason, each of the groups of prepared holes includes a second prepared hole 12b that is larger in diameter than the first prepared holes 12a. The second prepared hole 12b is located between the first prepared holes 12a located at both ends.

Note here that, in the method for manufacturing plate-shaped fins 3 according to Embodiment 2, only those parts of the aluminum plate material 11 which have been hollowed out to make the first prepared holes 12a and the second prepared hole 12b are discarded, therefore this makes it possible to use the material efficiently, and by extension to reduce the cost of the plate-shaped fins 3 (i.e. the heat exchanger 4).

Each of FIGS. 16 to 19 is an explanatory diagram for explaining the method for manufacturing plate-shaped fins according to Embodiment 2 of the present invention and also a plan view for explaining a cut line forming step.

Figure 16:
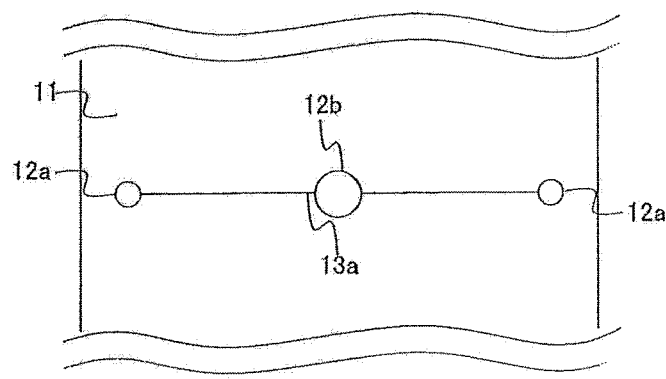
FIG. 16 is an explanatory diagram for explaining the method for manufacturing plate-shaped fins according to Embodiment 2 of the present invention and also a plan view for explaining a cut line forming step.

After the prepared hole forming step, a cut line is formed in each of the groups of prepared holes to connect the first prepared holes 12a. The cut line can take various shapes that vary depending on the shape of each of the reflare sections 6. For example, as shown in FIG. 16, a cut line 13a is formed to be on an imaginary straight line connecting the centers of the first prepared holes 12a located at both ends of the same group of prepared holes. In this case, as shown in FIG. 6, one rectangular reflare section 6 is formed in each of the positions that face both long axis side surfaces of the heat transfer tube 1.

Figure 17:
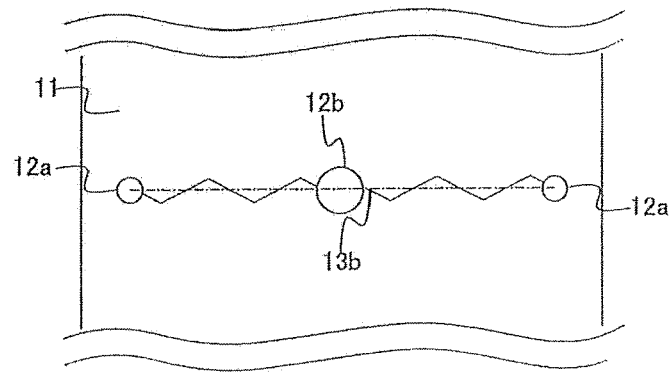
FIG. 17 is an explanatory diagram for explaining the method for manufacturing plate-shaped fins according to Embodiment 2 of the present invention and also a plan view for explaining a cut line forming step.
Figure 18:
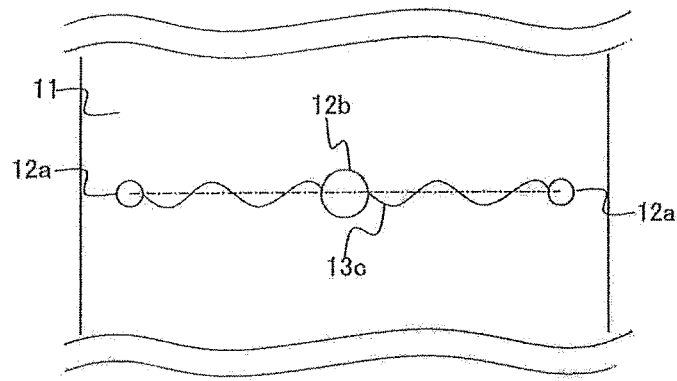
FIG. 18 is an explanatory diagram for explaining the method for manufacturing plate-shaped fins according to Embodiment 2 of the present invention and also a plan view for explaining a cut line forming step.
Figure 19:
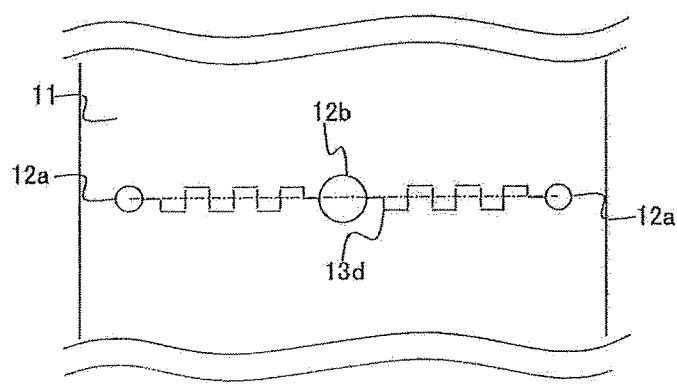
FIG. 19 is an explanatory diagram for explaining the method for manufacturing plate-shaped fins according to Embodiment 2 of the present invention and also a plan view for explaining a cut line forming step.

Alternatively, for example, as shown in FIGS. 17 to 19, a cut line is formed to have at least one point of intersection with an imaginary straight line connecting the centers of the first prepared holes 12a located at both ends of the same group of prepared holes. In this case, as shown in FIGS. 7 to 9, a plurality of reflare sections 6 are formed in a position that faces at least one long axis side surface of the heat transfer tube 1. Note here that the shape of each of the reflare sections 6 is made triangular as shown in FIG. 7 by forming a zigzag cut line 13b as shown in FIG. 17. Alternatively, the shape of each of the reflare sections 6 is made sinusoidal as shown in FIG. 9 by forming a sinusoidal cut line 13c as shown in FIG. 18. Alternatively, the shape of each of the reflare sections 6 is made rectangular as shown in FIG. 8 by forming a rectangular cut line 13d as shown in FIG. 19.

The shape of this cut line influences on the shape of each of the reflare sections 6 described in Embodiment 1. Details of the influence will be described in the step of forming fin collars 5 (raised portion forming step), which is a subsequent step.

Figure 20:
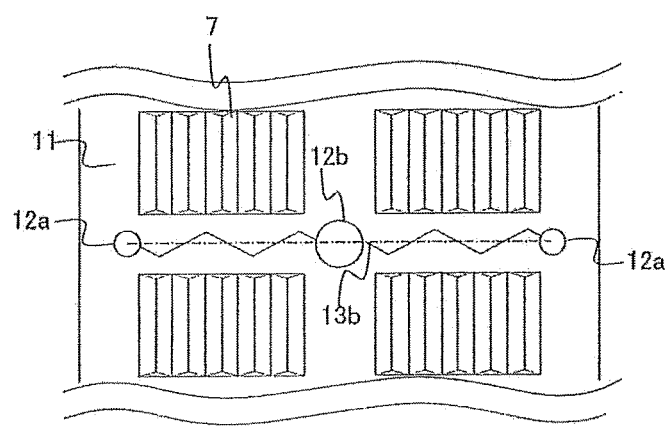
FIG. 20 is an explanatory diagram for explaining the method for manufacturing plate-shaped fins according to Embodiment 2 of the present invention and also a plan view for explaining a pressing step.

FIG. 20 is an explanatory diagram for explaining the method for manufacturing plate-shaped fins according to Embodiment 2 of the present invention and also a plan view for explaining a pressing step.

After the cult line forming step, the aluminum plate material 11 is pressed to form scratches 7. As mentioned above, these scratches 7 are intended to enhance the transfer of heat through those parts and to improve the buckling strength of the plate-shaped fins 3. It should be noted that in a case where no scratches 7 are formed, this step is not needed.

Figure 21:
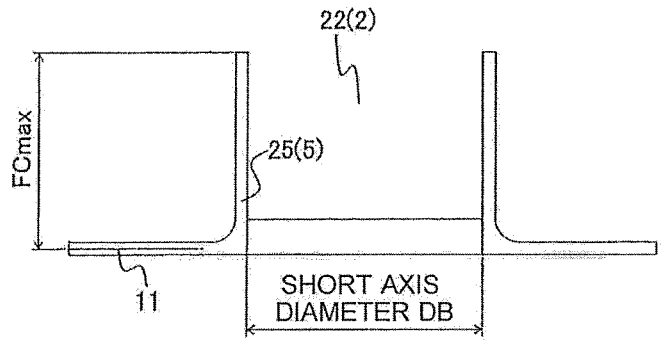
FIG. 21 is an explanatory diagram for explaining the method for manufacturing plate-shaped fins according to Embodiment 2 of the present invention and also an explanatory diagram (side view) for explaining a raised portion forming step.
Figure 22:
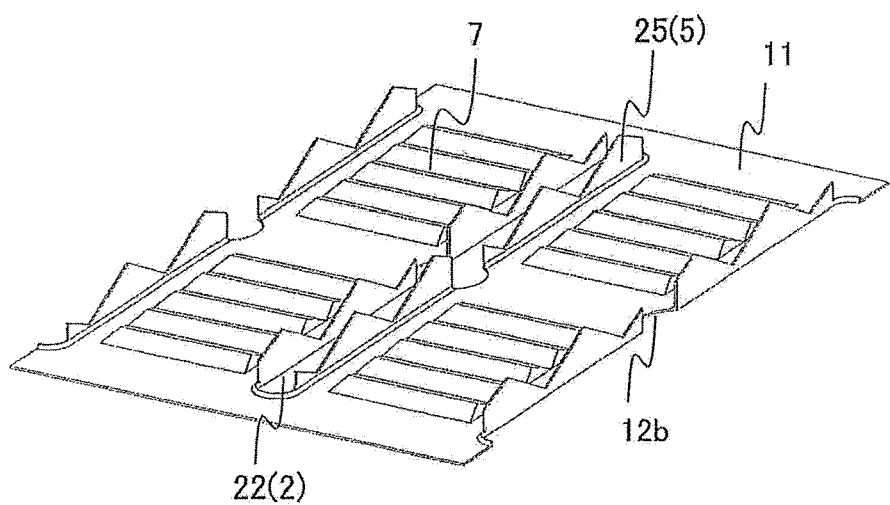
FIG. 22 is an explanatory diagram for explaining the method for manufacturing plate-shaped fins according to Embodiment 2 of the present invention and also an explanatory diagram (perspective view) for explaining the raised portion forming step.

Each of FIGS. 21 and 22 is an explanatory diagram for explaining the method for manufacturing plate-shaped fins according to Embodiment 2 of the present invention and also an explanatory diagram for explaining a raised portion forming step. It should be noted that FIG. 21 is a side view and FIG. 22 is a perspective view. Further, FIG. 22 shows a state that exists as a result of burring processing of the zigzag cut line 13b shown in FIG. 17.

After the pressing step, the cut line formed in the cut line forming step is subjected to burring processing, whereby raised portions 25 that are to become fin collars 5 and an opening 22 that is to become notches 2 are formed. At this point, the burring processing is performed so that the width of the opening 22 (i.e. the notches 2) becomes equal in length to the transfer tube short axis diameter DB.

Further, as shown in FIG. 21, in a case where FCmax is the maximum height of each of the raised portions 25 formed after the burring processing, the maximum height FCmax of each of the raised portions 25 varies depending on the shape of the cut line formed in the cut line forming step.

As shown in FIG. 22, in a case where the zigzag cut line 13b is formed to have at least one point of intersection with an imaginary straight line connecting the centers of the first prepared holes 12a located at both ends, the raised portions 25 have similarly zigzag ridge lines. That is, the height FC of each of the raised portions 25 varies along the imaginary straight line (extending in the longitudinal direction of the notches 2 and the long axis direction of the heat transfer tube 1) according to the angle of the zigzag and the pitches between zigzag tops. For this reason, the maximum height FCmax of each of the raised portions 25 falls within a range of DB/2<FCmax<DB.

It should be noted that the case of the zigzag cut line 13b shown in FIG. 22 is not the only case where the maximum height FCmax of each of the raised portions 25 falls within such a range. Also in the case of a cut line having at least one point of intersection with an imaginary straight line connecting the centers of the first prepared holes 12a located at both ends (see FIGS. 18 and 19), the maximum height FCmax of each of the raised portions 25 falls within such a range. Note, however, that in the case of a cut line formed on an imaginary straight line connecting the centers of the first prepared holes 12a located at both ends (see FIG. 16), the maximum height FCmax of each of the raised portions 25 is held constant at FCmax=DB/2.

After the raised portion forming step, a reflare section forming step of forming the reflare sections 6 is carried out. That is, the reflare sections 6 are formed by folding tip portions of the raised portions 25 in directions opposite to the long axis side surfaces of the heat transfer tube 1.

As described above, the reflare sections 6 according to Embodiment 1 have the following two roles:

Ensure the fin pitches FP; and

Enhance the transfer of heat through the tip portions 6b. Therefore, it is preferable that the maximum height FCmax of each of the raised portions 25 be as long as possible. This makes it possible to enhance heat transfer by making the reflare pitch RP longer while ensuring sufficient fin pitches FP. Further, by forming a cut line to have at least one point of intersection with an imaginary straight line connecting the centers of the first prepared holes 12a located at both ends, a plurality of reflare sections 6 can be formed on one side surface of the heat transfer tube 1. Moreover, the number of reflare sections 6 increases as the number of points of intersection becomes larger.

That is, in order for the reflare sections 6 according to Embodiment 1 of the present invention to soundly fulfill their roles, it is more effective to form a cut line to have a plurality of points of intersection with an imaginary straight line connecting the centers of the first prepared holes 12a located at both ends.

Note here that the maximum height FCmax of each of the raised portions 25 be at least longer than the fin pitch FP to form the reflare sections 6. That is, the maximum height FCmax of each of the raised portions 25 requires a length of FCmax>FP. Further, the maximum height FCmax of each of the raised portions 25 can be extended by performing a process called ironing that thins the raised portions 25 or performing a process called drawing that stretches the raised portions 25 by gathering wall thickness parts of the aluminum plate material 11. In a case where FCmax is equal to approximately 2FP, considering what height each of the fin collars 5 is required to have above the reflare base portion 6a and what length the reflare tip portion 6b is required to have to ensure the fin pitch FP, the reflare pitch RP is longer than half the length of the fin pitch FP. That is, RP>FP/2. This makes it possible to bring about improvement particularly in heat exchange performance.

For this reason, it is preferable that the raised portions 25 be formed so that the maximum height FCmax of each of the raised portions 25 is 1.0<(FCmax/FP)≤2.0.

Figure 23:
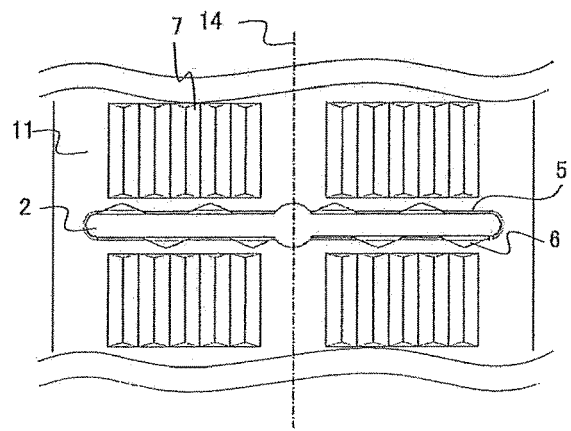
FIG. 23 is an explanatory diagram for explaining the method for manufacturing plate-shaped fins according to Embodiment 2 of the present invention and also a plan view for explaining a cutting step.

FIG. 23 is an explanatory diagram for explaining the method for manufacturing plate-shaped fins according to Embodiment 2 of the present invention and also a plan view for explaining a cutting step.

After the reflare section forming step, the aluminum plate material 11 is cut along a fin cut surface 14. That is, the aluminum plate material 11 is cut across the opening 22 along an array direction of the groups of prepared holes. This causes the raised portions 25 to become fin collars 5 and causes the opening 22 to become notches 2. As can be seen from FIG. 23, two plate-shaped fins 3 bordered by the fin cut surface 14 can be manufactured at a time by cutting the aluminum plate material 11 along the fin cut surface 14 (more specifically by cutting the aluminum plate material 11 at positions that are to become end portions of the plate-shaped fins 3 at the same time as or after cutting the aluminum plate material 11 along the fin cut surface 14). Thus, manufacturing plate-shaped fins 3 according to Embodiment 2 makes it possible to increase the capability of manufacturing plate-shaped fins 3.

It should be noted that although this is the end of Embodiment 2, the process for manufacturing a heat exchanger 4 includes performing a stacking step called stacking in which the plate-shaped fins 3 thus cut are stacked to a predetermined width of stacking so that the fin pitches FP are held constant by the reflare sections 6. Furthermore, after the stacking, the heat exchanger 4 is manufactured by inserting heat transfer tubes 1 into the notches 2 and bringing the heat transfer tubes 1 into contact with the plate-shaped fins 3 by furnace blazing.

REFERENCE SIGNS LIST 1 heat transfer tube 1b leeward side end portion 1c windward side end portion 2 notch 2a guiding portion 3 plate-shaped fin 3a bottom surface portion 3b windward side end portion 4 heat exchanger 5 fin collar 6 reflare section 6a reflare base portion 6b reflare tip portion 6c reflare terminal portion of tip portion 6d reflare windward portion 6e reflare tip portion 6f reflare tip portion 7 scratch 11 aluminum plate member 12a first prepared hole 12b second prepared hole 13a to 13d cut line 14 fin cut surface 22 opening 25 raised portion 104 heat exchanger.

The invention claimed is:

1. A heat exchanger comprising:
a plurality of plate-shaped fins arranged at predetermined fin pitches, each of the plate-shaped fins being provided with an opening; and
a heat transfer tube having a flattened shape and disposed in the opening,
each of the plurality of plate-shaped fins including, at circumferential portions thereof defining the opening, raised portions being in contact with the heat transfer tube,
each of the raised portions including a plurality of first portions that are in contact with an adjoining one of the plurality of plate-shaped fins,
the heat transfer tube having a first end portion that is one end of a flat-cross section in a longitudinal direction and a second end portion that is an other end of the flat-cross section in the longitudinal direction, the plurality of first portions being provided along the longitudinal direction of the flat-cross section in positions that face each of both side surfaces of the heat transfer tube, in the longitudinal direction, a distance between the first end portion and one of the plurality of first portions that is closest to the first end portion being different from a distance between the second end portion and another one of the plurality of first portions that is closest to the second end portion.

2. The heat exchanger of claim 1, wherein the number of the plurality of first portions provided in positions that face one of the both side surfaces of the heat transfer tube differs from the number of the plurality of first portions provided in positions that face an other of the both side surfaces of the heat transfer tube.

3. The heat exchanger of claim 1, wherein three or more of the plurality of first portions are provided in positions that face one of the both side surfaces of the heat transfer tube.

4. The heat exchanger of claim 1, wherein at least one of the plurality of first portions has a part being in contact with the adjoining one of the plurality of plate-shaped fins and a part being apart from the adjoining one of the plurality of plate-shaped fins.

\* \* \* \* \*